United States Patent
Chen et al.

(10) Patent No.: US 7,474,086 B2
(45) Date of Patent: Jan. 6, 2009

(54) FREQUENCY-ON-THE-FLY CONTROL CIRCUIT AND METHOD FOR A DC/DC PWM CONVERTER

(75) Inventors: Jiun-Chiang Chen, Houli Township, Taichung County (TW); Liang-Pin Tai, Tainan (TW)

(73) Assignee: Richtek Technology Corp., Hsinchu (TW)

( * ) Notice: Subject to any disclaimer, the term of this patent is extended or adjusted under 35 U.S.C. 154(b) by 172 days.

(21) Appl. No.: 11/583,012

(22) Filed: Oct. 19, 2006

(65) Prior Publication Data

US 2007/0241733 A1 Oct. 18, 2007

(30) Foreign Application Priority Data

Oct. 21, 2005 (TW) ............... 94136937 A

(51) Int. Cl.
G05F 1/40 (2006.01)
G05F 1/56 (2006.01)
G05F 1/618 (2006.01)

(52) U.S. Cl. .............. 323/288; 323/282; 323/284; 323/283

(58) Field of Classification Search ............ 323/288, 323/282, 284, 283
See application file for complete search history.

(56) References Cited

U.S. PATENT DOCUMENTS 5,638,260 A * 6/1997 Bees ................... 363/17

* cited by examiner

Primary Examiner—Bao Q Vu
(74) Attorney, Agent, or Firm—Rosenberg, Klein & Lee

(57) ABSTRACT

A control circuit and method are provided to generate a modulation signal to operate a power stage in a DC/DC PWM converter such that the DC/DC PWM converter is controlled to operate with high switching frequency in light load stead state, once load transient happens, it still operates with high switching frequency for good transient response, and in heavy load stead state, it is controlled to operate with low switching frequency for good efficiency.

11 Claims, 10 Drawing Sheets

FREQUENCY-ON-THE-FLY CONTROL CIRCUIT AND METHOD FOR A DC/DC PWM CONVERTER

FIELD OF THE INVENTION

The present invention is related generally to a direct-current-to-direct-current (DC/DC) pulse-width modulation (PWM) converter and, more particularly, to a control circuit and method for a DC/DC PWM converter.

BACKGROUND OF THE INVENTION

As shown in FIG. 1, a four-channel DC/DC PWM converter 10 comprises a control circuit 12 to manipulate a four-channel power stage 14, and each channel of the power stage 14 comprises two transistors 1404 and 1406 connected in series between an input voltage Vin and ground GND, in which the transistors 1404 and 1406 are alternatively switched by one of four modulation signals PWM[1] to PWM[4] provided by the control circuit 12, so as to produce four channel currents $I_{O1}$ to $I_{O4}$ respectively. The channel currents $I_{O1}$ to $I_{O4}$ are combined to an output current $I_O$ to charge a capacitor C to thereby produce an output voltage $V_O$. The control circuit 12 monitors the channel currents $I_{O1}$ to $I_{O4}$ and the output voltage $V_O$, in order to modulate the duty cycle of the transistors 1404 and 1406 in the power stage 14. FIG. 2 shows a circuit diagram of a conventional control circuit 12, in which a channel-current sensor 1236 senses the channel currents $I_{O1}$ to $I_{O4}$ to produce four current-sensing signals Ix[1] to Ix[4] respectively, a combiner 1234 combines the current-sensing signals Ix[1] to Ix[4] to produce a summing signal $I_{SUM}$ which flows through a resistor $R_{ADJ}$ connected between a pin ADJ and ground GND to produce an adjusting voltage $V_{ADJ}$, a digital-to-analog converter (DAC) 1202 converts a digital voltage signal VID[n:0] to an analog voltage VIA, a combiner 1204 combines the analog voltage VIA with the adjusting voltage $V_{ADJ}$ to produce a reference voltage signal Vref1, an error amplifier 1206 monitors the output voltage $V_O$ by comparing a feedback signal FB proportional to the output voltage $V_O$ with the reference voltage signal Vref1 to produce an error signal $V_{EA}$, four ramp generators 1210, 1212, 1214 and 1216 generate four ramp signals RAMP[1], RAMP[2], RAMP[3] and RAMP[4] respectively under a clock CLK provided by an oscillator 1208 according to the voltage on a pin OSC, a combiner 1218 shifts the level of the ramp signal RAMP[1] by the current-sensing signal Ix[1] to produce a ramp signal RAMP[1]', a comparator 1226 compares the error signal $V_{EA}$ with the ramp signal RAMP[1]' to produce the modulation signal PWM[1] for the first channel of the power stage 14, a combiner 1220 shifts the level of the ramp signal RAMP[2] by the current-sensing signal Ix[2] to produce a ramp signal RAMP[2]', a comparator 1228 compares the error signal $V_{EA}$ with the ramp signal RAMP[2]' to produce the modulation signal PWM[2] for the second channel of the power stage 14, a combiner 1222 shifts the level of the ramp signal RAMP[3] by the current-sensing signal Ix[3] to produce a ramp signal RAMP[3]', a comparator 1230 compares the error signal $V_{EA}$ with the ramp signal RAMP[3]' to produce the modulation signal PWM[3] for the third channel of the power stage 14, a combiner 1224 shifts the level of the ramp signal RAMP[4] by the current-sensing signal Ix[4] to produce a ramp signal RAMP[4]', a comparator 1232 compares the error signal $V_{EA}$ with the ramp signal RAMP[4]' to produce the modulation signal PWM[4] for the fourth channel of the power stage 14, and a resistor $R_{OSC}$ is connected between the pin OSC and ground GND for setting the switching frequency of the power stage 14.

FIG. 3 shows a conventional circuit for one channel of the channel-current sensor 1236, in which a transconductive amplifier 12362 senses the channel current $I_{O1}$ flowing through a sensing resistor R1, so as to produce a voltage drop $$V_S = I_{O1} \times R1 \qquad [\text{Eq-1}]$$

and due to the virtual short between the inputs CSP and CSN of the transconductive amplifier 12362, the voltage drop across a resistor Rx1 is equal to the voltage $V_S$, and therefore the transconductive amplifier 12362 produces the current-sensing signal $$Ix[1] = V_S/Rx1 = (I_{O1} \times R1)/Rx1 \qquad [\text{Eq-2}]$$

For a DC/DC PWM converter, it is very important to control the switching frequency of the transistors 1404 and 1406 in the power stage 14. FIG. 4 shows a waveform diagram of the output current $I_O$ and the output voltage $V_O$ when the transistors 1404 and 1406 are switched with low switching frequency, in which waveform 20 represents the output current $I_O$, waveform 22 represents the adjusting voltage $V_{ADJ}$, waveform 24 represents the output voltage $V_O$, and waveform 26 represents the average voltage $V_O$(AVG) of the output voltage $V_O$. As the load changes from light to heavy, the output current $I_O$ suddenly increases as shown by the waveform 20, the adjusting voltage $V_{ADJ}$ also increases with the increasing output current $I_O$ as shown by the waveform 22 since it is proportional to the output current $I_O$, the output voltage $V_O$ drops down to a lower level until the load changes from heavy back to light, and then the output voltage $V_O$ will recover to the previous level, as shown by the waveform 24. In this case, because the switching frequency is low, the power stage 14 is not easy to heat when the load is heavy, thereby having good efficiency. However, due to the low switching frequency, as shown by the waveform 26, the output voltage $V_O$ cannot keep at a predetermined level immediately when the load transient happens, and hence lower when changing from light load to heavy load and higher when changing from heavy load to light load, causing poor transient response.

FIG. 5 shows a waveform diagram of the output current $I_O$ and the output voltage $V_O$ when the transistors 1404 and 1406 are switched with high switching frequency, in which waveform 30 represents the output current $I_O$, waveform 32 represents the adjusting voltage $V_{ADJ}$, waveform 34 represents the output voltage $V_O$, and waveform 36 represents the average voltage $V_O$(AVG) of the output voltage $V_O$. As the load changes from light to heavy, the output current $I_O$ suddenly increases as shown by the waveform 30, the adjusting voltage $V_{ADJ}$ also increases with the increasing output current $I_O$ as shown by the waveform 32 since it is proportional to the output current $I_O$, the output voltage $V_O$ drops down to a lower level until the load changes from heavy back to light, and then the output voltage $V_O$ will recover to the previous level, as shown by the waveform 34. In this case, as shown by the waveform 36, because the switching frequency is high, the output voltage $V_O$ can keep at a predetermined level immediately when the load transient happens. However, the power stage 14 is easy to heat when the load is heavy, due to the high switching frequency, thereby resulting in poor efficiency, as shown by the waveform 34.

Therefore, it is desired a control circuit and method to improve both heavy load efficiency and load transient response of a DC/DC PWM converter.

SUMMARY OF THE INVENTION

An object of the present invention is to provide a control circuit and method to improve both heavy load efficiency and load transient response of a DC/DC PWM converter.

Another object of the present invention is to provide a control circuit and method for a DC/DC PWM converter to operate with an adaptive switching frequency.

In particular, a DC/DC PWM converter is so improved that in light load stead state, it is controlled to operate with high switching frequency, once load transient happens, it still operates with high switching frequency for good transient response, and in heavy load stead state, it is controlled to operate with low switching frequency instead.

According to the present invention, a control circuit and method are provided to generate a modulation signal to operate a power stage in a DC/DC PWM converter to produce an output voltage and an output current. The control circuit comprises a frequency-determining circuit for providing a signal whose frequency changes with the output current, so as to adjust the frequency of the modulation signal and thereby control the DC/DC PWM converter to operate with adaptive switching frequency.

By using an adaptive switching frequency, a DC/DC PWM converter may operate with high switching frequency in light load steady state for better transient response to increasing load, and with low switching frequency in heavy load steady state for better efficiency.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
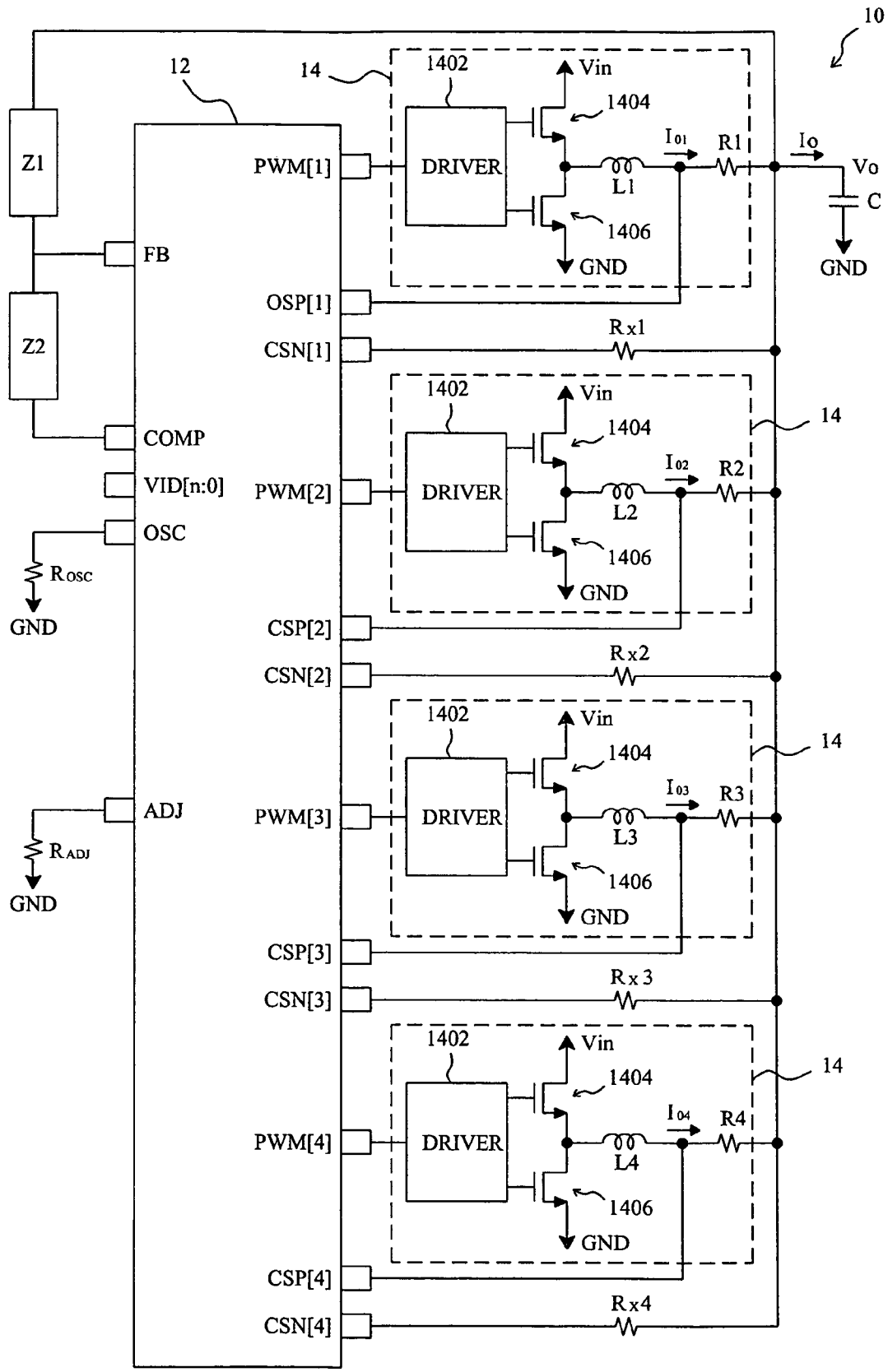
FIG. 1 shows a four-channel DC/DC PWM converter.
Figure 2:
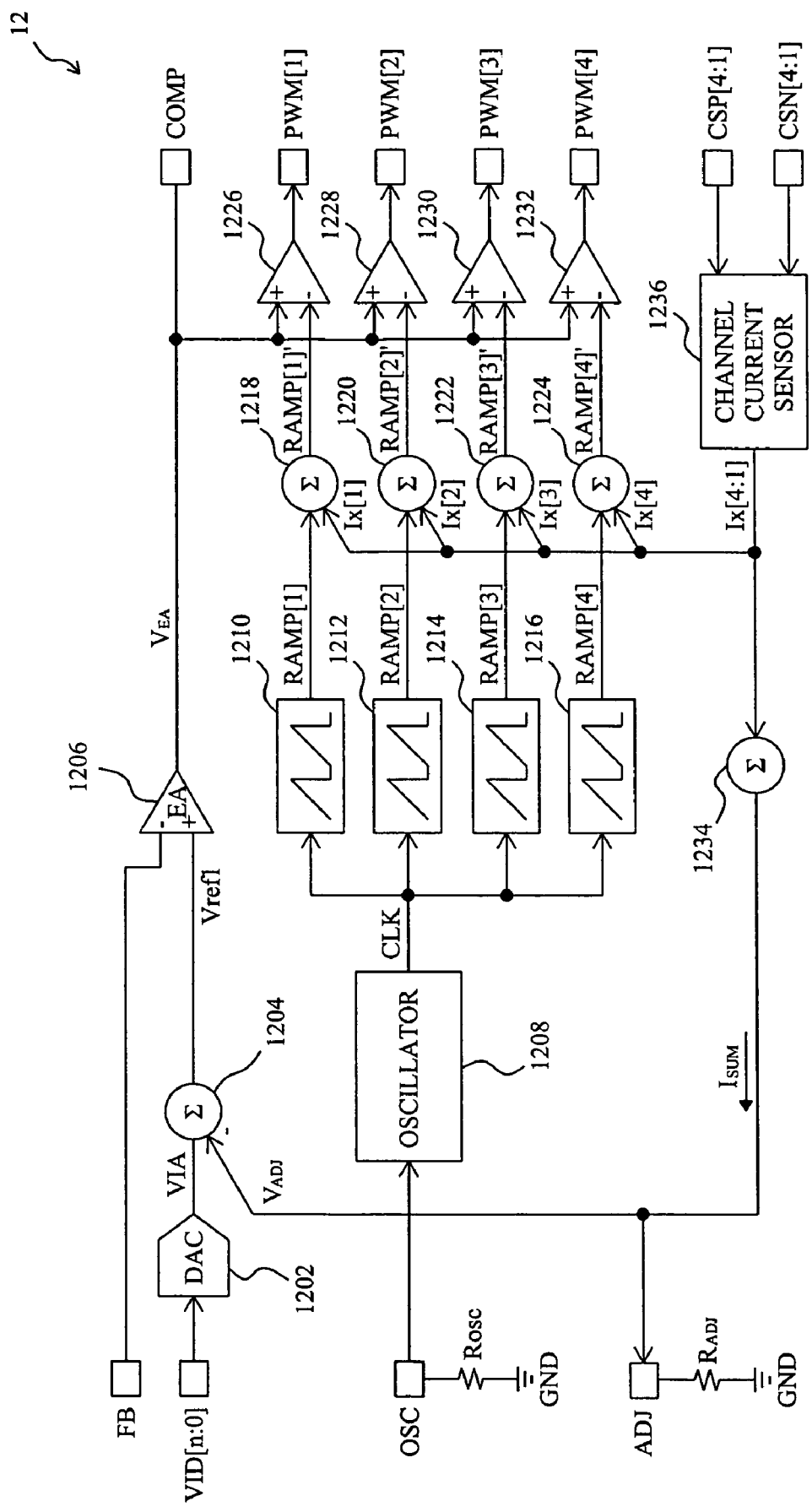
FIG. 2 shows a circuit diagram of a conventional control circuit for the DC/DC PWM converter of FIG. 1.
Figure 3:
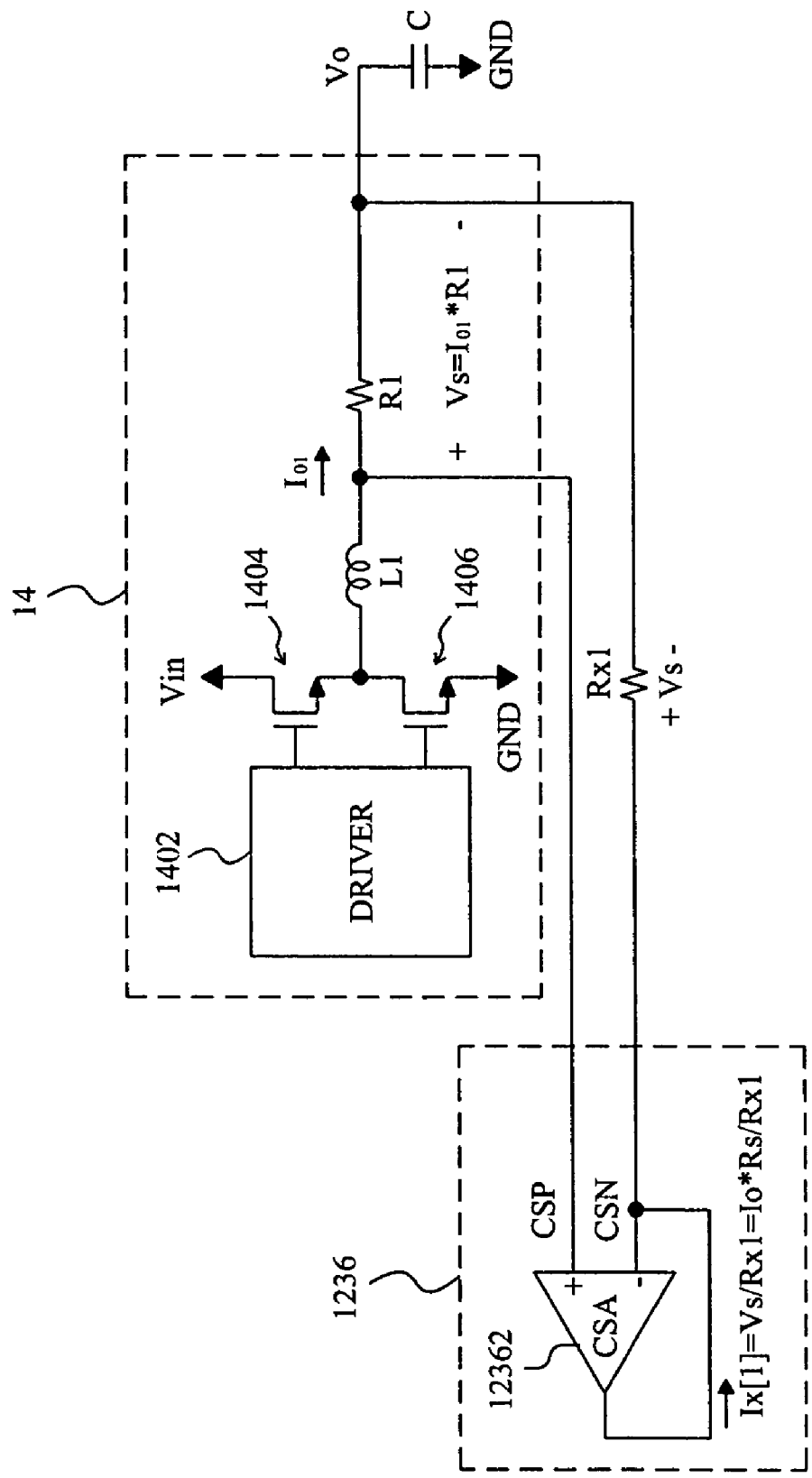
FIG. 3 shows a conventional circuit for one channel of the channel-current sensor shown in FIG. 2.
Figure 4:
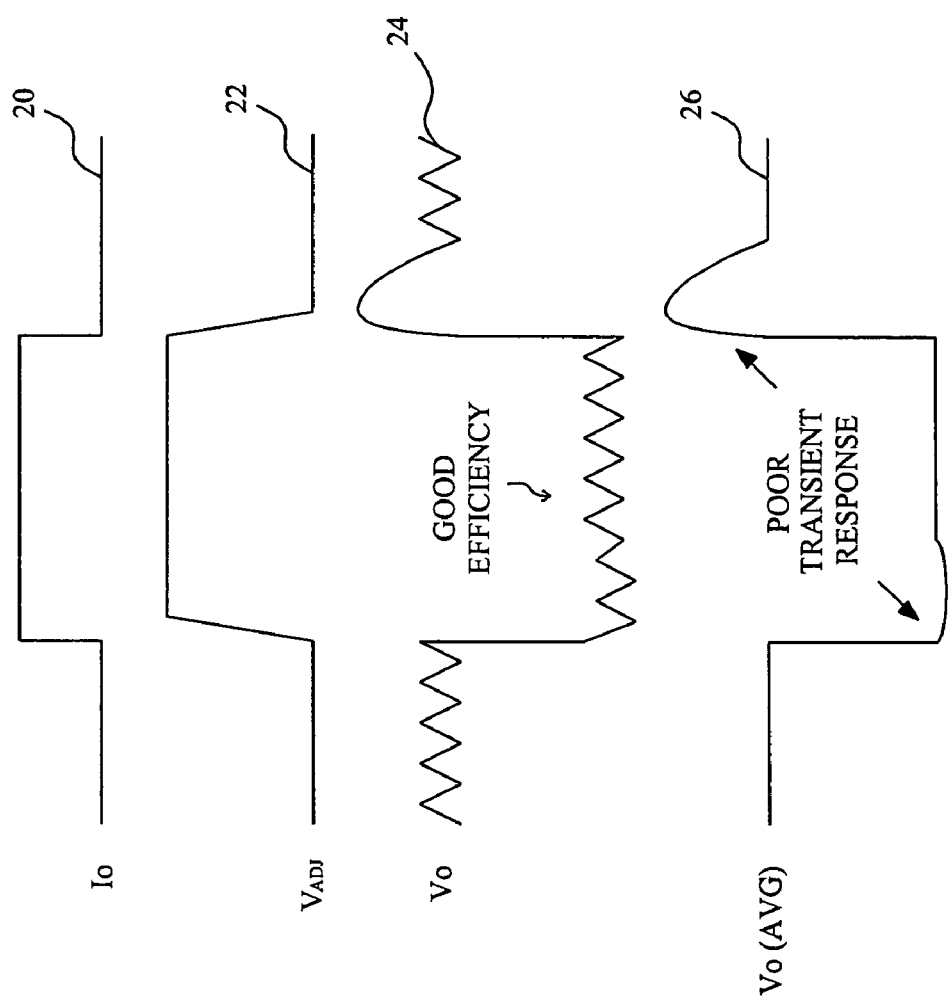
FIG. 4 shows a waveform diagram of the output current and the output voltage when the control circuit of FIG. 2 controls the DC/DC PWM converter of FIG. 1 to operate with low switching frequency.
Figure 5:
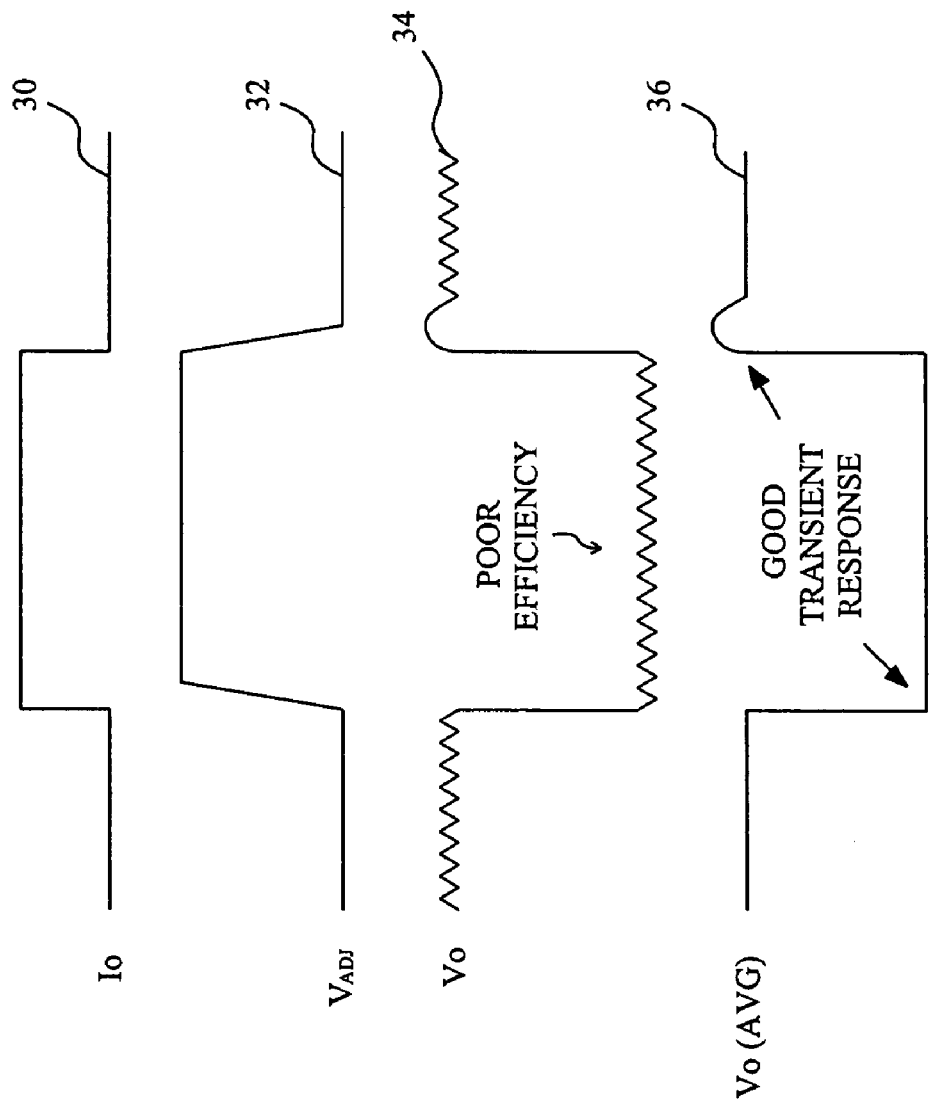
FIG. 5 shows a waveform diagram of the output current and the output voltage when the control circuit of FIG. 2 controls the DC/DC PWM converter of FIG. 1 to operate with high switching frequency.
Figure 6:
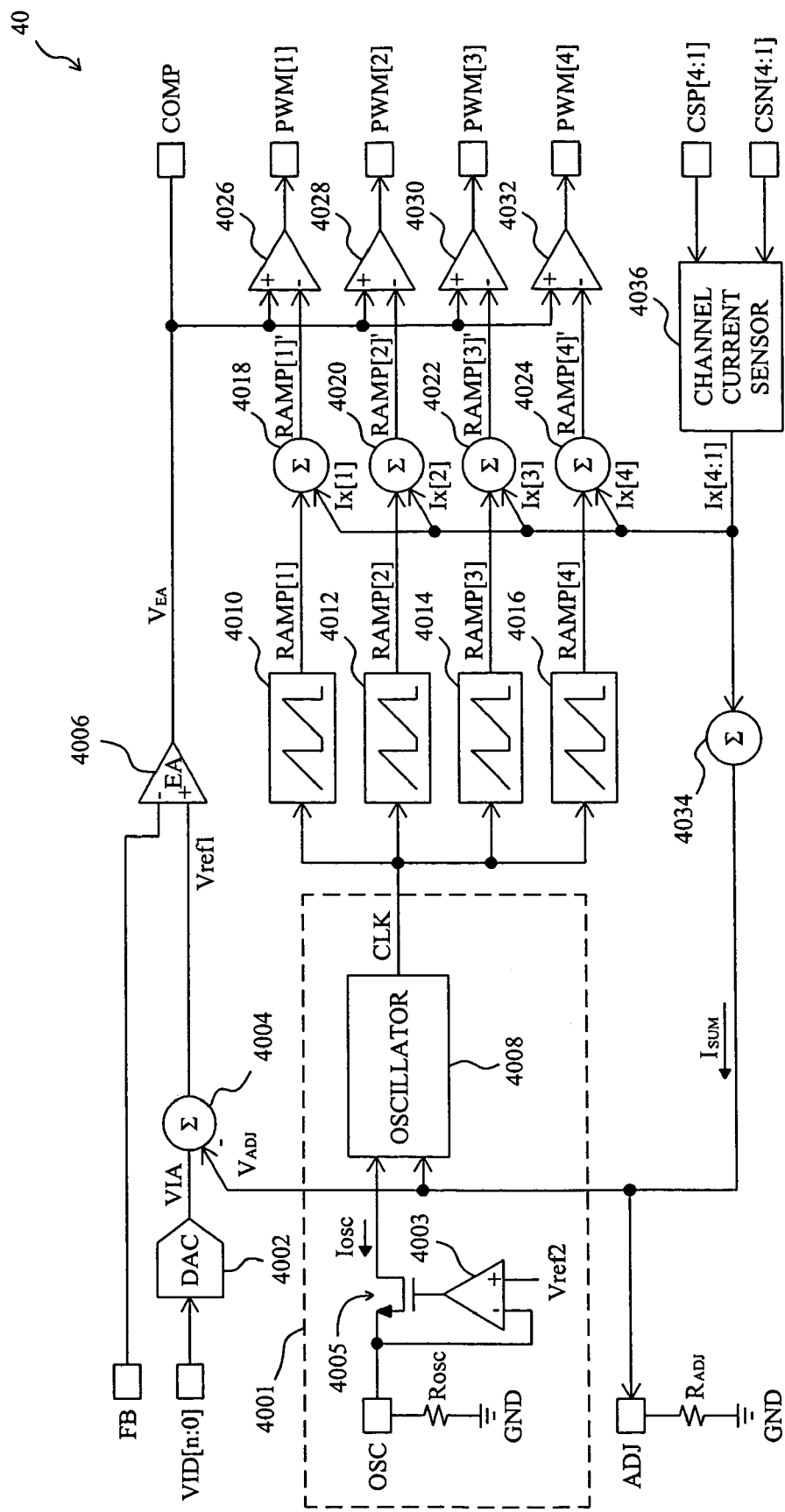
FIG. 6 shows an embodiment according to the present invention.

FIG. 6 shows an embodiment according to the present invention. For illustration, the control circuit 40 shown in FIG. 6 is designed for the control circuit 12 shown in FIG. 1 to implement the DC/DC PWM converter 10. In the control circuit 40, a channel-current sensor 4036 senses the channel currents $I_{O1}$ to $I_{O4}$ of the power stage 14 to produce four current-sensing signals Ix[1] to Ix[4] respectively, a combiner 4034 combines the current-sensing signals Ix[1] to Ix[4] to produce a summing signal $I_{SUM}$ which flows through a resistor $R_{ADJ}$ to produce an adjusting voltage $V_{ADJ}$, and therefore the adjusting voltage $V_{ADJ}$ changes with the output current $I_O$ of the DC/DC PWM converter 10 as $$\begin{aligned}V_{ADJ} &= k1 \times I_{SUM} \times R_{ADJ} \\ &= k2 \times I_O \times R_{ADJ} \\ &= k3 \times I_O\end{aligned} \qquad [\text{Eq-3}]$$

where k1, k2 and k3 are constant when the circuit parameters of the control circuit 40 are determined. A digital voltage signal VID[n:0] is converted to an analog voltage VIA by a DAC 4002, a combiner 4004 subtracts the adjusting voltage $V_{ADJ}$ from the analog voltage signal VIA to produce a reference voltage signal Vref1, an error amplifier 4006 monitors the output voltage $V_O$ by comparing a feedback signal FB proportional to the output voltage $V_O$ with the reference voltage signal Vref1 to produce an error signal $V_{EA}$, a frequency-determining circuit 4001 comprises a transistor 4005 connected between an oscillator 4008 and a resistor $R_{OSC}$, an operational amplifier 4003 having a non-inverting input connected with a reference voltage signal Vref2, an inverting input connected to the transistor 4005 and the resistor $R_{OSC}$, and an output connected to the gate of the transistor 4005, in order to lock the voltage drop across the resistor $R_{OSC}$ at the level of the reference voltage signal Vref2 to produce a constant current $I_{OSC}$ for the oscillator 4008, the oscillator 4008 produces a clock CLK whose frequency changes with the output current $I_O$ by responding to the constant current $I_{OSC}$ and the adjusting voltage $V_{ADJ}$, four ramp generators 4010, 4012, 4014 and 4016 generate four ramp signals RAMP[1], RAMP[2], RAMP[3] and RAMP[4] under the clock CLK respectively, a combiner 4018 shifts the level of the ramp signal RAMP[1] by the current-sensing signal Ix[1] to produce a ramp signal RAMP[1]', a comparator 4026 compares the error signal $V_{EA}$ with the ramp signal RAMP[1]' to produce the modulation signal PWM[1] for the first channel of the power stage 14, a combiner 4020 shifts the level of the ramp signal RAMP[2] by the current-sensing signal Ix[2] to produce a ramp signal RAMP[2]', a comparator 4028 compares the error signal $V_{EA}$ with the ramp signal RAMP[2]' to produce the modulation signal PWM[2] for the second channel of the power stage 14, a combiner 4022 shifts the level of the ramp signal RAMP[3] by the current-sensing signal Ix[3] to produce a ramp signal RAMP[3]', a comparator 4030 compares the error signal $V_{EA}$ with the ramp signal RAMP[3]' to produce the modulation signal PWM[3] for the third channel of the power stage 14, a combiner 4024 shifts the level of the ramp signal RAMP[4] by the current-sensing signal Ix[4] to produce a ramp signal RAMP[4]', and a comparator 4032 compares the error signal $V_{EA}$ with the ramp signal RAMP[4]' to produce the modulation signal PWM[4] for the fourth channel of the power stage 14. The resistor $R_{OSC}$ could be used for setting the value of the constant current $I_{OSC}$.

Figure 7:
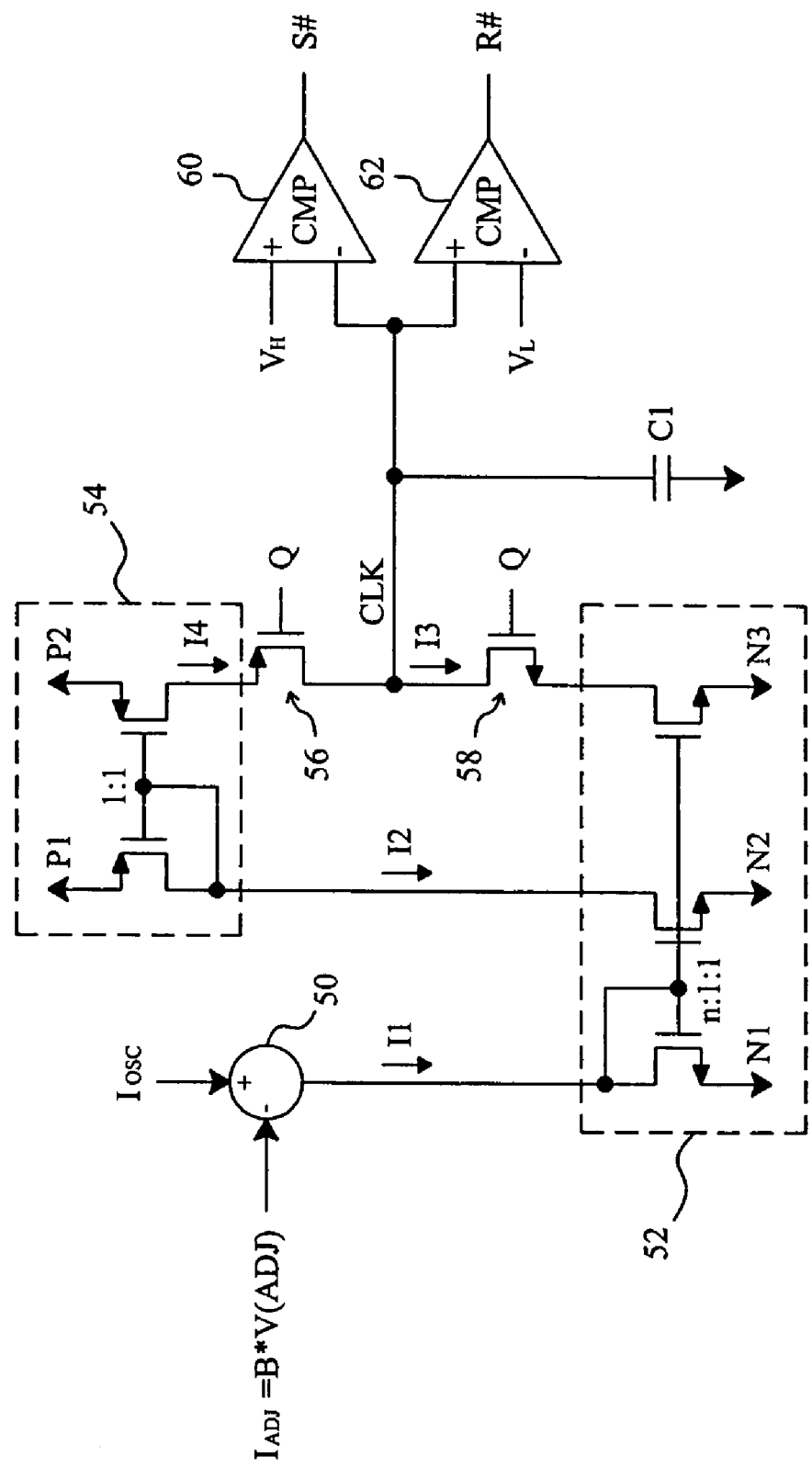
FIG. 7 shows an embodiment circuit for the oscillator shown in FIG. 6.

FIG. 7 shows an embodiment circuit of the oscillator 4008 shown in FIG. 6, in which a combiner 50 subtracts an adjusting current $I_{ADJ}$, which changes with the adjusting voltage $V_{ADJ}$, for example $I_{ADJ}=B \times V_{ADJ}$, where B is a constant, from the constant current $I_{OSC}$ to produce a current I1, and therefore the current I1 changes with the output current $I_O$. A current mirror 52 mirrors the current I1 to produce two currents I2 and I3, and a current mirror 54 mirrors the current I2 to produce a current I4. The current mirror 52 includes three transistors N1, N2 and N3 having an aspect ratio of n:1:1, and the current mirror 54 includes two transistors P1 and P2 having an aspect ratio of 1:1. A PMOS transistor 56 is controlled by a signal Q to source the current I4 to a capacitor C1, a NMOS transistor 58 is controlled by the signal Q to sink the current I3 from the capacitor C1, and the clock CLK is derived from the voltage on the capacitor C1 by switching the switches 56 and 58 by the signal Q to charge/discharge the capacitor C1 with the currents I4 and I3. A comparator 60 compares the clock CLK with a reference voltage $V_H$ to produce a signal S#, and a comparator 62 compares the clock CLK with a reference voltage $V_L$ to produce a signal R#. A SR latch (not shown in FIG. 8) may be used to produce the signal Q in response to the signals S3 and R#.

Figure 8:
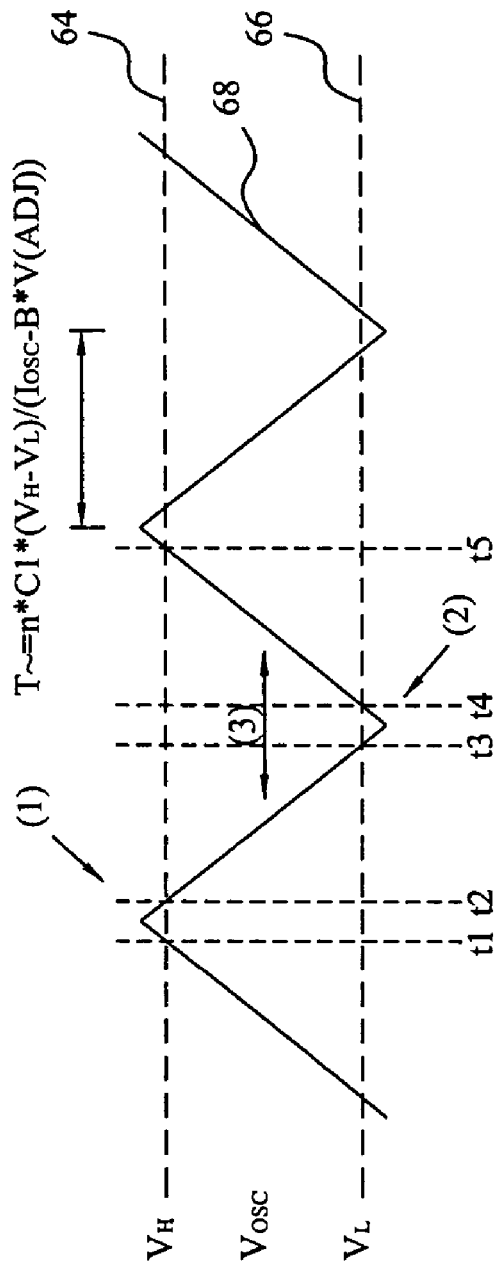
FIG. 8 shows a waveform diagram of the clock shown in FIG. 7.

FIG. 8 shows a waveform diagram of the clock CLK and the truth table of the signals S#, R# and Q shown in FIG. 7, in which waveform 64 represents the reference voltage $V_H$, waveform 66 represents the reference voltage $V_L$, and waveform 68 represents the clock CLK. During the period of time t1 to time t2, the clock CLK is higher than the reference voltages $V_H$ and $V_L$, so that the signal S# is at logical low, the signal R# is at logical high, and the signal Q is at logical high, as shown in the table of FIG. 8. Accordingly, the PMOS transistor 56 turns off and the NMOS transistor 58 turns on, thereby discharging the capacitor C1 by the current I3, and decreasing the clock CLK. During the period of time t2 to time t3, the clock CLK is lower than the reference voltage $V_H$ but higher than the reference voltage $V_L$, so that the signal S# changes from logical low to logical high, the signal R# keeps at logical high, and the signal Q keeps at the previous level, as shown in the table of FIG. 8. Therefore, the PMOS transistor 56 still turns off and the NMOS transistor 58 still turns on, resulting in the capacitor C1 being discharged by the current I3 continuously. During the period of time t3 to time t4, the clock CLK is lower than the reference voltages $V_H$ and $V_L$, so that the signal R# changes from logical high to logical low, the signal S# keeps at the previous level, and the signal Q changes to logical low, as shown in the table of FIG. 8. Accordingly, the PMOS transistor 56 turns on and the NMOS transistor 58 turns off, thereby charging the capacitor C1 by the current I4, and increasing the clock CLK. During the period of time t4 to time t5, the clock CLK is lower than the reference voltage $V_H$ but higher than the reference voltage $V_L$, so that the signal R# changes from logical low to logical high, the signal S# keeps at logical high, and the signal Q keeps at logical low, as shown in the table of FIG. 8. Therefore, the PMOS transistor 56 still turns on and the NMOS transistor 58 still turns off, resulting in the capacitor C1 being charged by the current I4 continuously.

The time period of charging or discharge the capacitor C1 is $$T=(n \times C1 \times (V_H-V_L))/I1 \quad [\text{Eq-4}]$$

and therefore the clock has the frequency $$F=1/2T=I1/(2\times(n\times C1\times(V_H-V_L))) \quad [\text{Eq-5}]$$

Further, because $I1=I_{OSC}-I_{ADJ}$, and $I_{ADJ}=B\times V_{ADJ}$, the equation Eq-5 can be written as $$\begin{aligned} F &= (I_{OSC} - B \times V_{ADJ})/(2 \times (n \times C1 \times (V_H - V_L))) \quad [\text{Eq-6}] \\ &= k4(I_{OSC} - B \times V_{ADJ}) \\ &= k4(I_{OSC} - B \times k3 \times I_O) \\ &= k5 - k6 \times I_O \end{aligned}$$

where k4, k5 and k6 are constant when the circuit parameters of the oscillator shown in FIG. 7 are determined. As shown in the equation Eq-6, when the output current $I_O$ increases, the frequency F of the clock CLK decreases, and contrarily, when the output current $I_O$ decreases, the frequency F of the clock CLK increases. Since the frequency of the modulation signals PWM[1] to PWM[4] are determined by the clock CLK, it will change as the frequency of the clock CLK changes, thereby changing the switching frequency of the power stage 14.

Figure 9:
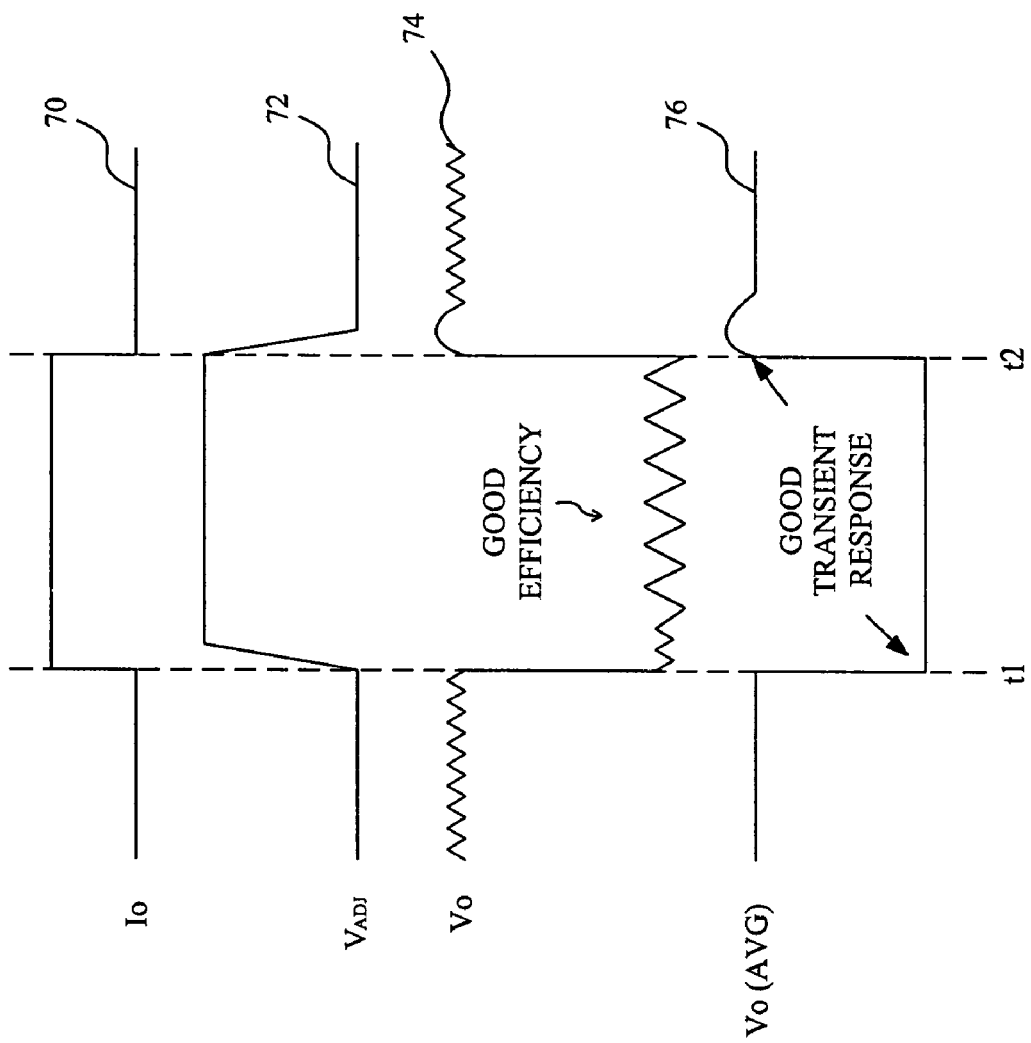
FIG. 9 shows a waveform diagram of the output current and the output voltage of a DC/DC PWM converter using the control circuit of FIG. 6 in transient state.

FIG. 9 shows a waveform diagram of the output current $I_O$ and the output voltage $V_O$ of the DC/DC PWM converter 10 using the control circuit 40 in transient state, in which waveform 70 represents the output current $I_O$, waveform 72 represents the adjusting voltage $V_{ADJ}$, waveform 74 represents the output voltage $V_O$, and waveform 76 represents the average $V_O$ (AVG) of the output voltage $V_O$. At light load, for example before time t1 or after time t2, the output current $I_O$ is at low level, and the clock CLK has high frequency according to the equation Eq-6, so that the switching frequency of the power stage 14 is high. When load transient happens at time t1, and the load changes from light to heavy, due to the switching frequency being still high, the output voltage $V_O$ can keep at a predetermined level immediately when it drops down, thereby having good transient response. During the heavy loading period, for example from time t1 to time t2, the output current $I_O$ is greater, and according to the equation Eq-6, the frequency of the clock CLK will decrease with the increasing output current $I_O$, so that the switching frequency of the power stage 14 also decreases, and the transistors 1404 and 1406 will not be easy to heat, hence having the DC/DC PWM converter 10 operating with good efficiency. When load transient happens again at time t2 from heavy loading to light loading, the output current $I_O$ changes from high level to low level, so that the switching frequency of the power stage 14 increases, and the output voltage $V_O$ can keep at the previous level immediately when it increases, thereby having good transient response.

Figure 10:
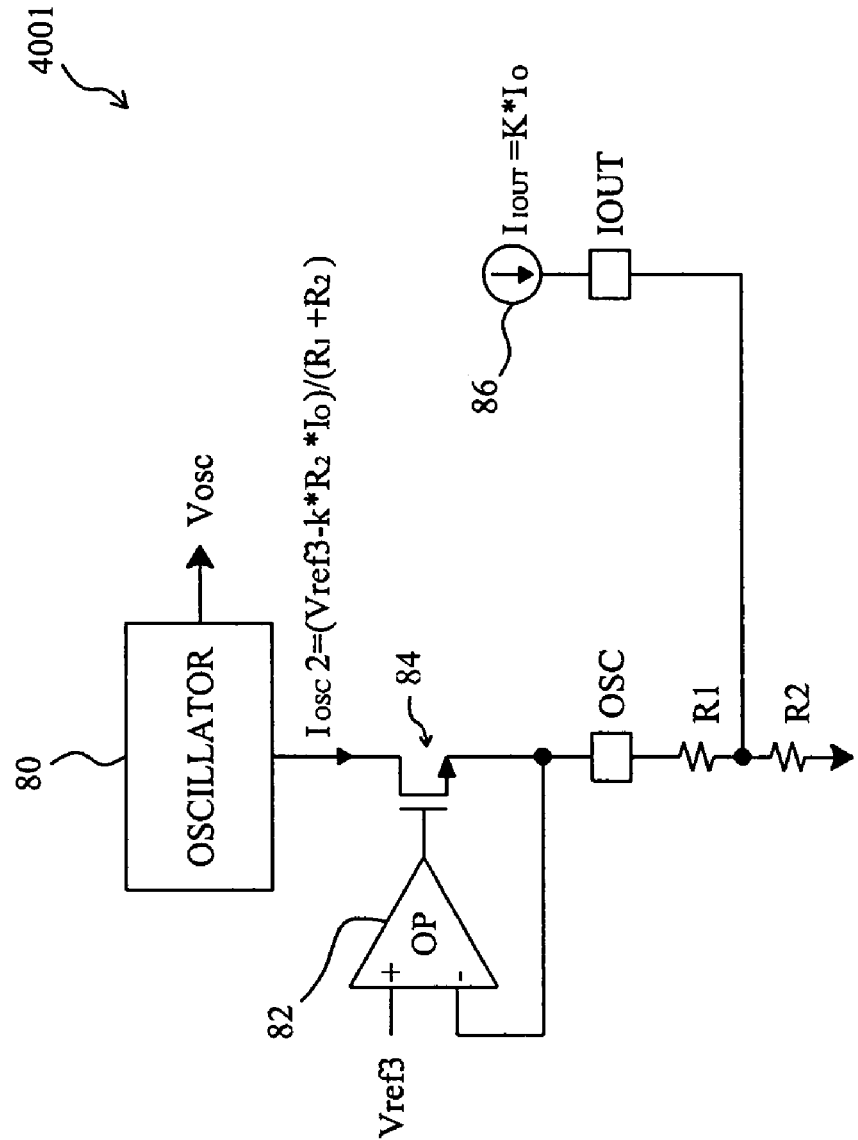
FIG. 10 shows another embodiment circuit for the frequency-determining circuit shown in FIG. 6.

FIG. 10 shows another embodiment circuit of the frequency-determining circuit 4001, in which a transistor 84 is connected between an oscillator 80 and a resistor R1 to conduct a current $I_{OSC2}$ from the oscillator 80, an operational amplifier 82 has a non-inverting input connected with a reference voltage Vref3, an inverting input connected to the transistor 84 and the resistor R1, and an output connected to the gate of the transistor 84, and a current source 86 provides a current $I_{IOUT}$ proportional to the output current $I_O$ to a resistor R2 serially connected to the resistor R1, $$I_{IOUT}=k7\times I_O \quad [\text{Eq-7}]$$

where k7 is a constant determined by the circuit designer. Because the operational amplifier 82 locks the voltage on the pin OSC at the level of the reference voltage Vref3, it is obtained according to the Ohm's law $$V\text{ref3}=I_{OSC2}\times R1+(I_{OSC2}+I_{IOUT})\times R2 \quad [\text{Eq-8}]$$

According to the equation Eq-7, the equation Eq-8 can be written as $$V\text{ref3} = I_{OSC}2 \times R1 + (I_{OSC}2 + k7 \times I_O) \times R2 \quad [\text{Eq-9}]$$

Therefore, it is obtained the current $$I_{OSC}2 = (V\text{ref3} - k7 \times R2 \times I_O)/(R1+R2) \quad [\text{Eq-10}]$$

In this embodiment, by removing the currents $I_{ADJ}$ and $I_{OSC}$ and the combiner 50 from the circuit of FIG. 7, and replacing the current I1 of FIG. 7 with the current $I_{OSC}2$, it will be a circuit for the oscillator 80, and the clock CLK has the frequency $$\begin{aligned}
F &= I_{OSC}2/(2 \times (n \times C1 \times (V_H - V_L))) \quad [\text{Eq-11}] \\
&= k8 \times I_{OSC}2 \\
&= k8 \times (V\text{ref3} - k7 \times R2 \times I_O)/(R1 + R2) \\
&= k9 - k10 \times I_O
\end{aligned}$$

where k8, k9 and k10 are constant when the circuit parameters of the oscillator 80 are determined. From the equation Eq-11 it is shown that, if the output current $I_O$ increases, the frequency of the clock CLK will decrease, and contrarily, if the output current $I_O$ decreases, the frequency of the clock CLK will increase. Therefore, the DC/DC PWM converter 10 can operate with high switching frequency in light load steady state, in order to stabilize the output voltage $V_O$ quickly, i.e., good transient response, when the load changes from light to heavy and from heavy to light, while operate with low switching frequency in heavy load steady state for good efficiency by reducing the heat generation.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A frequency-on-the-fly control circuit for a DC/DC PWM converter having a power stage to be operated with a switching frequency to produce an output voltage and an output current, the control circuit comprising:
   an error amplifier for monitoring the output voltage to produce a first signal;
   a frequency-determining circuit for providing a second signal whose frequency changes with the output current, the frequency-determining circuit receiving a current signal indicative of the output current and generating the second signal responsive thereto;
   a ramp generator in response to the second signal for generating a first ramp signal whose frequency changes with the output current;
   a combiner for shifting the first ramp signal by a current-sensing signal representative of a channel current produced by the power stage, to produce a second ramp signal; and
   a comparator for comparing the first signal with the second ramp signal to produce a modulation signal whose frequency changes with the output current to operate the power stage with the switching frequency;
   wherein the switching frequency decreases when the output current increases and increases when the output current decreases.

2. The control circuit of claim 1, further comprising a channel-current sensor for sensing the channel current produced by the power stage to produce the current-sensing signal.

3. The control circuit of claim 1, wherein the frequency-determining circuit comprises:
   an oscillator for producing the second signal according to a constant current and a third signal changing with the output current;
   a resistor;
   a transistor connected between the oscillator and the resistor; and
   an operational amplifier having a non-inverting input connected with a reference voltage, an inverting input connected to the transistor and the resistor, and an output for controlling the transistor, in order to lock the voltage drop across the resistor at the level of the reference voltage to produce the constant current.

4. The control circuit of claim 3, wherein the third signal is proportional to the output current.

5. The control circuit of claim 3, wherein the oscillator comprises:
   a second combiner for subtracting a first current derived from the third signal from the constant current to produce a second current changing with the output current;
   a first current mirror for mirroring the second current to produce a third current and a fourth current;
   a second current mirror for mirroring the third current to produce a fifth current;
   a capacitor;
   a first switch for sourcing the fifth current to the capacitor; and
   a second switch for sinking the fourth current from the capacitor;
   wherein the second switch turns off when the first switch turns on, and the first switch turns off when the second switch turns on, such that the fourth current and the fifth current alternatively charge and discharge the capacitor to produce the second signal.

6. The control circuit of claim 1, wherein the frequency-determining circuit comprises:
   an oscillator for producing the second signal according to a first current changing with the output current;
   a transistor connected between the oscillator and a node for the first current to flow therethrough;
   a first resistor and a second resistor connected in series to the node;
   a current source for providing a second current proportional to the output current to flow through the second resistor; and
   an operational amplifier having a non-inverting input connected with a reference voltage, an inverting input connected to the node, and an output for controlling the transistor to lock the voltage on the node.

7. The control circuit of claim 6, wherein the oscillator comprises:
   a first current mirror for mirroring the first current to produce a third current and a fourth current;
   a second current mirror for mirroring the third current to produce a fifth current;
   a capacitor;
   a first switch for sourcing the fifth current to the capacitor; and a second switch for sinking the fourth current from the capacitor;

wherein the second switch turns off when the first switch turns on, and the first switch turns off when the second switch turns on, such that the fifth current and the fourth current alternatively charge and discharge the capacitor to produce the second signal.

8. A frequency-on-the-fly control method for a DC/DC PWM converter having a power stage to be operated with a switching frequency to produce an output voltage and an output current, the control method comprising:

monitoring the output voltage for producing a first signal;

frequency-determining responsive to a current signal indicative of the output current to generate a second signal whose frequency changes with the output current;

in response to the second signal, generating a first ramp signal whose frequency changes with the output current;

shifting the first ramp signal by a current-sensing signal representative of a channel current produced by the power stage, for producing a second ramp signal; and comparing the first signal with the second ramp signal for producing a modulation signal whose frequency changes with the output current to operate the power stage with the switching frequency;

wherein the switching frequency decreases when the output current increases and increases when the output current decreases.

9. The control method of claim 8, further comprising the step of sensing the channel current produced by the power stage for producing the current-sensing signal.

10. The control method of claim 8, wherein the step of providing a second signal whose frequency changes with the output current comprises the steps of:

providing a first current;

providing a second current changing with the output current;

subtracting the second current from the first current for producing a third current changing with the output current;

mirroring the third current for producing a fourth current and a fifth current;

mirroring the fourth current for producing a sixth current; and alternatively charging and discharging a capacitor with the sixth current and the fifth current for producing the second signal.

11. The control method of claim 8, wherein the step of providing a second signal whose frequency changes with the output current comprises the steps of:

providing a first current changing with the output current;

mirroring the first current for producing a second current and a third current;

mirroring the second current for producing a fourth current; and alternatively charging and discharging a capacitor with the fourth current and the third current for producing the second signal.

* * * * *